(12) United States Patent
Van Nguyen et al.

(10) Patent No.: US 8,726,261 B2
(45) Date of Patent: May 13, 2014

(54) ZERO DOWNTIME HARD DISK FIRMWARE UPDATE

(75) Inventors: Cuong Van Nguyen, Houston, TX (US); Stanley Hatch, Spring, TX (US); Christopher W. Holmes, Cypress, TX (US); Daniel J. Mazina, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 529 days.

(21) Appl. No.: 13/081,132

(22) Filed: Apr. 6, 2011

(65) Prior Publication Data

US 2012/0260242 A1 Oct. 11, 2012

(51) Int. Cl.
*G06F 9/44* (2006.01)

(52) U.S. Cl.
USPC .......................................................... 717/168

(58) Field of Classification Search
None
See application file for complete search history.

(56) References Cited

U.S. PATENT DOCUMENTS

| | | | |
|---|---|---|---|
| 6,772,310 B2* | 8/2004 | Thompson et al. | 711/166 |
| 6,807,605 B2* | 10/2004 | Umberger et al. | 711/114 |
| 6,851,070 B1* | 2/2005 | Rodrigues et al. | 714/5.11 |
| 7,080,243 B2* | 7/2006 | Ramiz et al. | 713/1 |
| 7,191,437 B1 | 3/2007 | Coatney et al. | |
| 7,231,493 B2 | 6/2007 | Nguyen et al. | |
| 7,370,248 B2* | 5/2008 | Tapper et al. | 714/718 |
| 7,426,633 B2* | 9/2008 | Thompson et al. | 713/2 |
| 7,613,945 B2* | 11/2009 | Soran et al. | 714/5.11 |
| 7,770,165 B2 | 8/2010 | Olson et al. | |
| 7,831,857 B2* | 11/2010 | Muppirala et al. | 714/5.11 |
| 7,925,831 B2* | 4/2011 | Murotani et al. | 711/114 |
| 8,214,685 B2* | 7/2012 | Rosychuk | 714/6.3 |
| 2004/0019752 A1* | 1/2004 | Burton et al. | 711/154 |
| 2005/0102603 A1* | 5/2005 | Tapper et al. | 714/770 |
| 2005/0155029 A1* | 7/2005 | Nguyen et al. | 717/168 |
| 2006/0259756 A1* | 11/2006 | Thompson et al. | 713/2 |
| 2007/0220313 A1* | 9/2007 | Katsuragi et al. | 714/6 |
| 2008/0141235 A1 | 6/2008 | Woodbury et al. | |
| 2009/0077547 A1* | 3/2009 | Kakinoki | 717/168 |
| 2010/0115215 A1* | 5/2010 | Rosychuk | 711/162 |
| 2010/0287348 A1* | 11/2010 | Sampathkumar | 711/162 |
| 2011/0107317 A1* | 5/2011 | Nolterieke et al. | 717/168 |

FOREIGN PATENT DOCUMENTS

| | | |
|---|---|---|
| CN | 1991761 A | 7/2007 |
| JP | 2008-27202 A | 9/2008 |

OTHER PUBLICATIONS

HP Data Protector A.06.11 Zero downtime backup concepts guide, Sep. 2009.*
HP StorageWorks 2300 Modular Smart Array reference guide, Jan. 2009.*
HP Smart Array Controller technology technology brief, 2006, retreived on Sep. 26, 2013.*

(Continued)

*Primary Examiner* — Insun Kang

(57) ABSTRACT

An embodiment includes determining which disks need an update, then copying user data from a disk to be updated to a spare disk. New data is written to both the disk to be updated and the spare disk, and a zone map is maintained for all volumes of the disk to be updated. The firmware on the disk is updated, and changed data is copied from the spare disk to the newly updated disk based on the zone map. New data is written to both the newly updated disk and the spare disk. Once the changed data has been copied to the newly updated disk, data is written to the newly updated disk.

20 Claims, 5 Drawing Sheets

(56) References Cited

OTHER PUBLICATIONS

HP Smart Array 6i Controller User Guide, Copyright 2003 Hewlett-Packard.*

Author Unknown, DeltaV Controller Redundancy, [online], publication date Sep. 2009, retrieved from http://www2.emersonprocess.com/siteadmincenter/PM%20DeltaV%Documents/ProductDataSheet/PDS_ControllerReel.pdf, [retrieved on Aug. 10, 2010], Emerson Process Management, 5 pages.

Author Unknown, Online Hard Disk Drive Firmware Upgrades?, retrieved from <http://forums13.itrc.hp.com/service/forums/questionanswer.do?admit=109447627+1280919595655+28353475&threadId=1355228>, [retrieved on Aug. 10, 2010], HP IT Resource Center, 3 pages.

* cited by examiner

100

400

ZERO DOWNTIME HARD DISK FIRMWARE UPDATE

BACKGROUND

Hard disks are typically grouped together in a storage array in order to increase fault tolerance, data integrity, and performance. Hard disks can be arranged in a Redundant Array of Independent Disks (RAID), which may include an array controller to manage data contained on each hard disk. There are various RAID "levels," each corresponding to a different level of redundancy among hard disks.

Each hard disk contains firmware, which controls the hard disk's internal hardware and data access. The firmware can be updated or replaced through a process known as "flashing." Currently, in order to flash hard disk firmware, the entire array must be powered down because data cannot be read or written while flashing. After the flash is complete, the hard disk must be rebooted. Accordingly, the hard disk experiences downtime while the system is being flashed and rebooted. This process of flashing can be relatively long, even more so for a computer system using a large number of hard disks.

BRIEF DESCRIPTION OF THE DRAWINGS

Certain exemplary embodiments are described in the following detailed description and in reference to the drawings, in which.

DETAILED DESCRIPTION

Embodiments of the present technique provide for a zero downtime hard disk firmware update, and may be used with all Redundant Array of Independent Disk (RAID) levels. Additionally, embodiments of the present invention operate to provide a fast rebuild of a flashed hard disk. Further, an embodiment of the present invention can operate on either fault tolerant or non-fault tolerant volumes.

Figure 1:
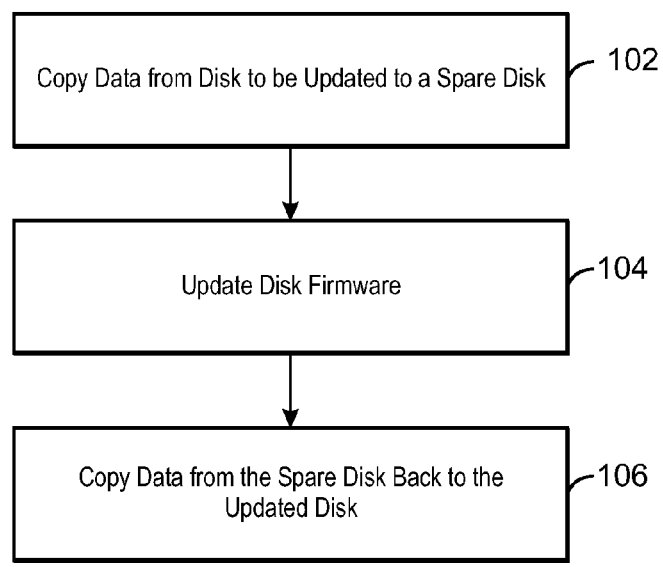
FIG. 1 is a block diagram presenting a conceptual overview of a method for flashing firmware on a drive in a storage system, in accordance with an embodiment of the present techniques.

FIG. 1 is a block diagram presenting a conceptual overview of a method 100 for flashing firmware on a drive in a storage system, in accordance with embodiment of the present techniques. The storage system may include numerous storage arrays, each of which may have numerous hard disks of multiple types. For example, the storage arrays may include units such as HP StorageWorks Modular Smart Arrays (MSA) or HP StorageWorks 1210m, both available from the Hewlett Packard Corporation. The techniques described herein are not limited to any particular storage array, as they may be used with HP StorageWorks XP disk arrays, StorageWorks Enterprise Virtual Array (EVA), and arrays available from other manufacturers.

As indicated by block 102, the content stored on the first hard disk of the array to be updated is copied to a spare hard disk. The data contained on this hard disk remains accessible during the entire copy process. Writes to the drive to be updated are duplicated onto the spare drive. The process of copying data to a spare disk may be done each time a hard disk is updated.

At block 104, the firmware of the hard disk is updated. Typically, during this time, all writes to the drive being updated may be rerouted to the spare hard disk. After the firmware has been updated, as indicated by block 106, the content stored on the spare hard disk is copied back onto the newly updated hard disk. During this stage, writes may be written to both the spare hard disk and the newly updated hard disk. The copying process may be seen more clearly in FIG. 3. When the data has been copied back to the newly updated drive, another hard disk may be updated.

Figure 2:
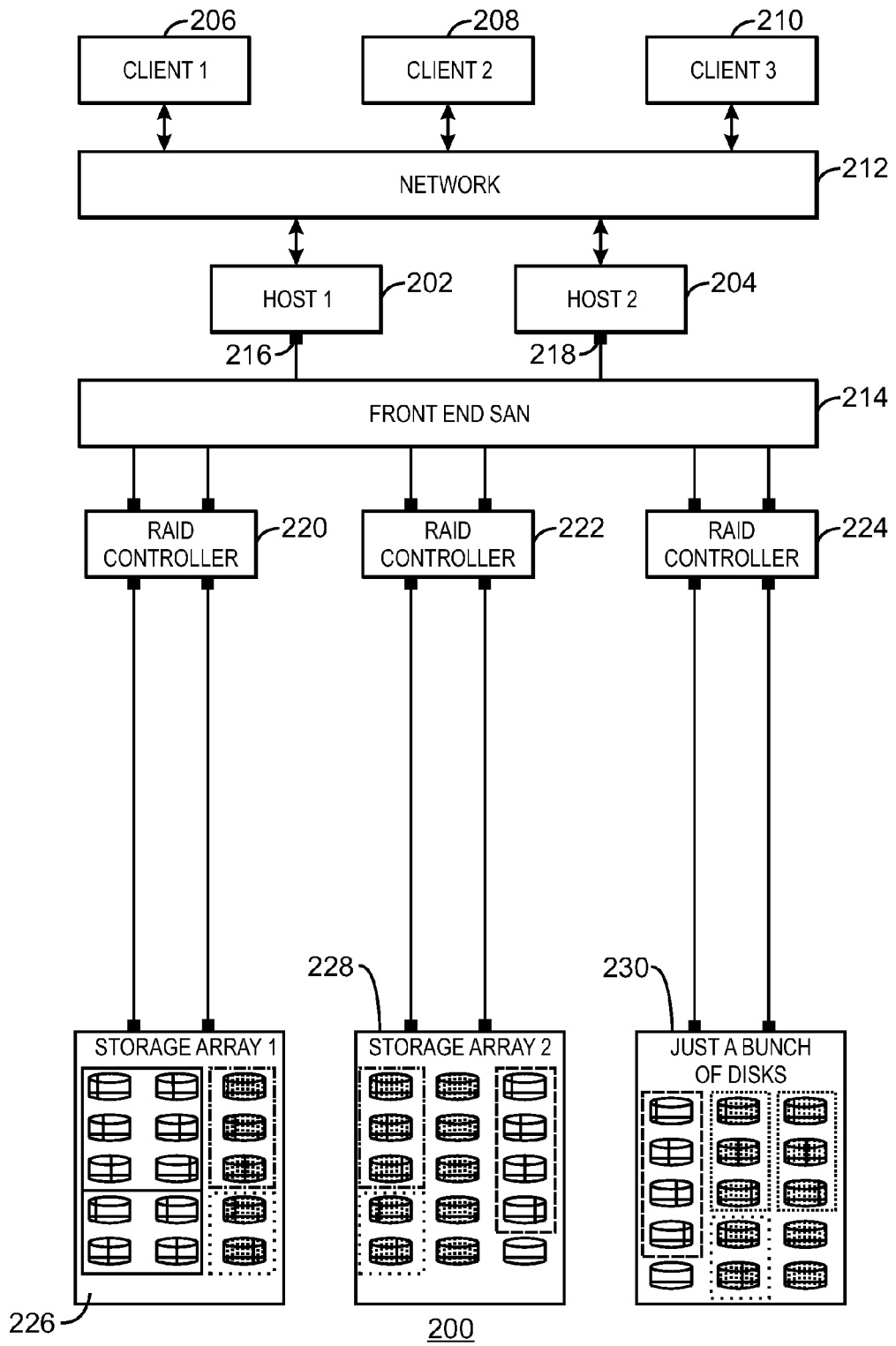
FIG. 2 is a block diagram of a storage system, in accordance with an embodiment of the present techniques.

FIG. 2 is a block diagram of a storage system 200, in accordance with an embodiment of the present techniques. However, the techniques are not limited to the configuration of storage system 200, as any number of configurations can be used. For example, a large storage system 200 may often have many more hosts and storage arrays than shown in this illustration. The storage system 200 may be accessed from one or more host computers, such as host1 202 and host2 204. The host computers 202 and 204 may provide data, such as Web pages, database screens, and other services, to one or more client computers, such as client 1 206, client 2 208, and client 3 210, for example, over a network 212. The network 212 may be a local area network (LAN), wide area network (WAN), a storage area network (SAN), or other network, such as the Internet. The host computers 202 and 204 may be coupled to a SAN 214, for example, by one or more Fibre Channel (FC) ports or Small Computer System Interfaces (SCSI), such as SCSI 216 and SCSI 218 (indicated as blocks).

One or more storage RAID controllers, such as RAID controller 220, RAID controller 222, and RAID controller 224 may be coupled through SCSI 216 and SCSI 218 to the SAN 214. Additionally, RAID controller 220, RAID controller 222, RAID controller 224, and SAN 214 may facilitate data transfer between the host computers 202 and 204 and one or more locations coupled to a number of storage arrays, including storage array 1 226 and storage array 2 228, and just a bunch of disks (JBOD) 230. Alternatively, in a direct attached scenario, storage system 200 may operate without a SAN 214, and the RAID controllers may connect directly to host1 202 and host2 204.

Figure 3:
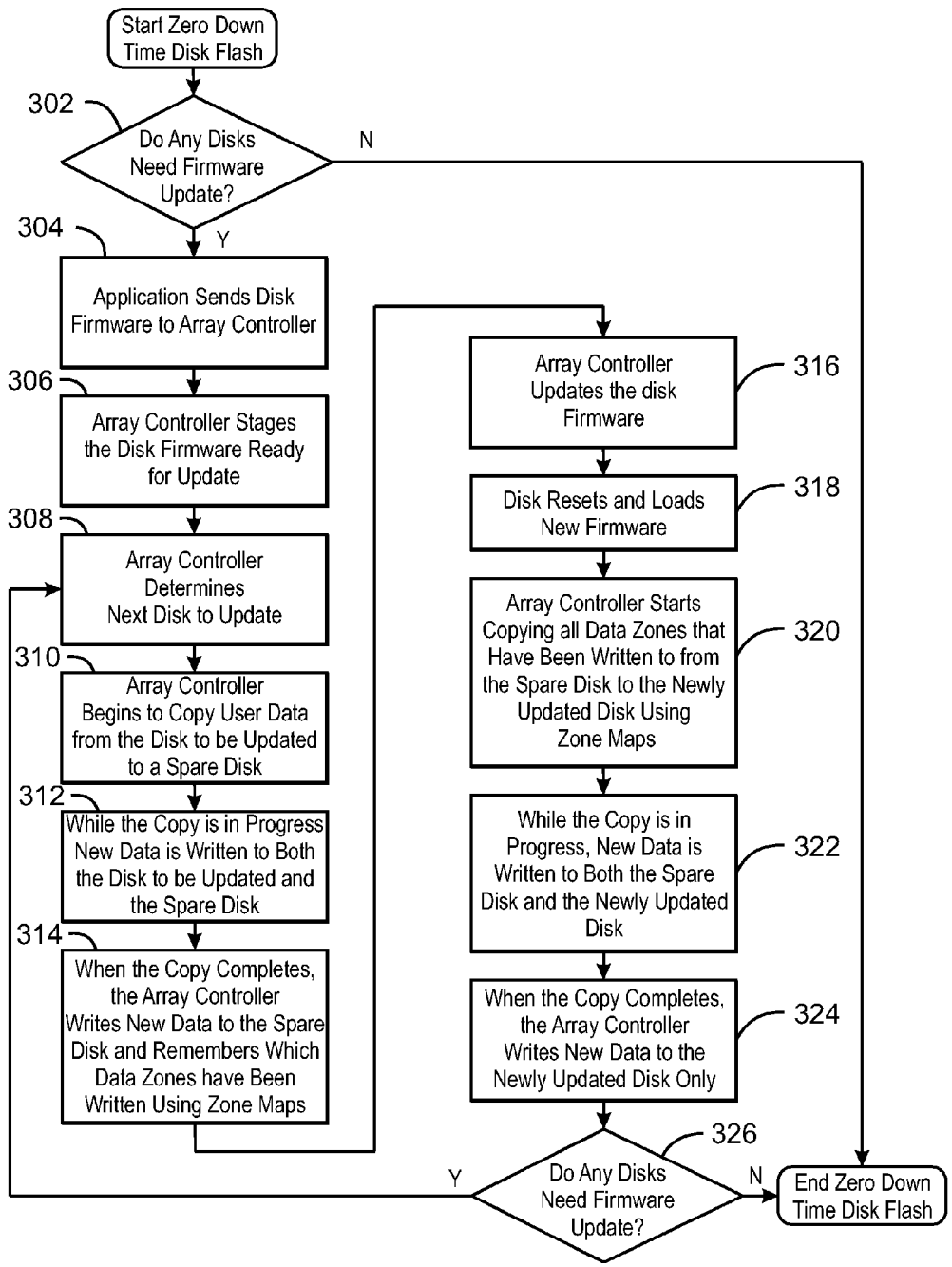
FIG. 3 is a process flow diagram showing a computer-executed method for a zero downtime hard disk firmware update according to an embodiment of the present techniques.

FIG. 3 is a process flow diagram 300 showing a computer-executed method for a zero downtime hard disk firmware update according to an embodiment of the present techniques. At block 302, the array controller may determine if any disks need a firmware update. In order to determine what disks, if any, need a firmware update, the disks needing such an update must first be discovered. For example, a product identification number may be used to determine which hard disks need a firmware update. If any hard disk needs the firmware update, the method continues to block 304. If no disk needs a firmware update, the method ends. At block 304, the firmware update is sent to the array controller. Additionally, a zero downtime flash option may be selected. At block 306, the array controller stages the firmware update, which may include writing the firmware update in a reserved section of each disk to be flashed. The array controller may also check that the written firmware update is valid.

At block 308, the array controller determines the next disk to update. Preconditions may also be checked to ensure that zero downtime flash is available. Zero downtime flash may not be available, for example, if there is no spare disk available. In the event that a spare disk is not available, zero downtime flash may be disabled, and a status message may be issued by the array controller that zero downtime flash is not supported.

Additionally, zero downtime flash may not be available if there is any other flash operation in progress. In the event another disk flash is in progress, the another disk flash operation may be continuously polled for a status update. An indication that the disk flash is in-progress, complete, or failed may be returned. The in-progress notification may include an estimated percentage complete. The present technique may continue to poll for the status of the disk flash as long as the status query returns an in-progress status. When the another disk flash operation is complete, a list of all disks that are zero downtime flashable may be built by the array controller.

The present technique does not use RAID levels for fault tolerance. As a result, all RAID levels can be used with the zero downtime flash. A RAID controller may manage data contained on each hard disk. In order for a disk to be on the zero downtime flashable list, the disk may belong to the particular RAID controller that is managing the flash operation. Further, disks that are not assigned to any volume may be simultaneously flashed.

When zero downtime flash begins, the disk being flashed may be removed from the zero downtime flashable list. At block 310, the array controller copies user data from the disk to be flashed onto a spare disk. The array controller may also initialize and maintain a zone map for volumes that store data on the disk. This zone map can be used later at block 320 to reduce the amount of time required to copy the data. The array controller may also set a flag to indicate that zero downtime flash is enabled for that particular disk.

At block 312, while the disk copy is in progress, the array controller writes new data to both the disk to be updated as well as the spare disk. At block 314, when the copy to the spare hard disk is complete, writes may be sent to the spare hard disk and are no longer duplicated. Any writes to the spare drive will set bits in the zone map, maintained by the array controller, indicating that the data has been changed. When the copy is complete, the disk may be ready for a zero downtime flash. The array controller uses the spare disk to satisfy any new I/O requests. Writes to the spare disk may continue to set bits in the zone map maintained by the array controller indicating that data has been changed. At block 316, zero downtime flash begins and the array controller may update the disk firmware. At block 318, the disk resets and loads the new firmware after the last command to flash is sent to the drive.

At block 320, the array controller may begin copying all data indicated by the zone map that contains new data as a result of writes to the spare disk while the disk firmware was updating. The new data is copied from the spare disk back to the newly updated disk. The zones of user data being copied may consist of a mixture of the original user data, copied at block 310, plus any new user data that is written during blocks 312 through block 320. Using zone maps to rebuild the disk allows for portions of the data that have been changed to be updated on the newly flashed hard disk, while portions of the data that have not been changed may be bypassed during the second copy process. This process may be referred to as a fast rebuild. At block 322, while the copy is in progress, new data is written to both the spare disk and the newly updated disk. At block 324, when the copy completes, the array controller writes new data to the newly updated disk only. The spare disk is no longer needed for this zero downtime disk flash and can be used for the next zero downtime disk flash. At block 326, the array controller determines if any more disks need a firmware update. If more disks need the firmware update, the method returns to block 308. If no more disks need a firmware update, the method ends.

Figure 4:
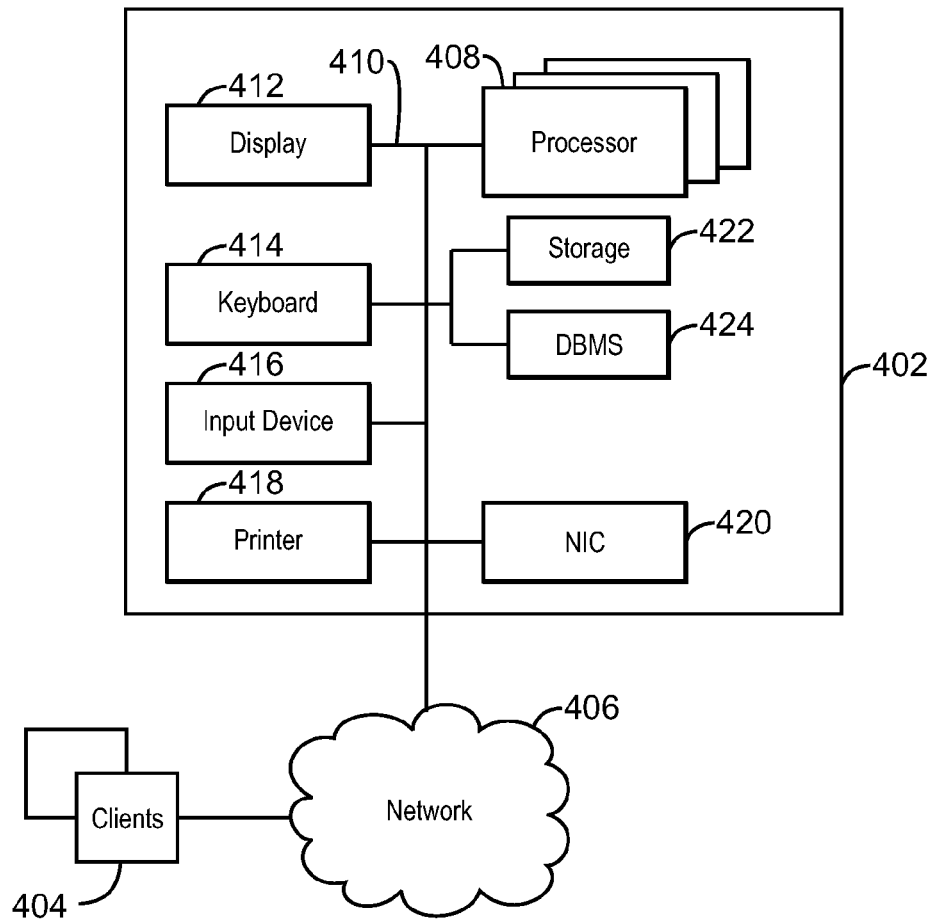
FIG. 4 is a block diagram of a system that may provide a zero downtime flash according to an embodiment of the present techniques.

FIG. 4 is a block diagram of a system that may provide a zero downtime flash according to an embodiment of the present techniques. The system is generally referred to by the reference number 400. Those of ordinary skill in the art will appreciate that the functional blocks and devices shown in FIG. 4 may comprise hardware elements including circuitry, software elements including computer code stored on a tangible, machine-readable medium, or a combination of both hardware and software elements. Additionally, the functional blocks and devices of the system 400 are but one example of functional blocks and devices that may be implemented in an embodiment. Those of ordinary skill in the art would readily be able to define specific functional blocks based on design considerations for a particular electronic device.

The system 400 may include a server 402, and one or more client computers 404, in communication over a network 406. As illustrated in FIG. 4, the server 402 may include one or more processors 408 which may be connected through a bus 410 to a display 412, a keyboard 414, one or more input devices 416, and an output device, such as a printer 418. The input devices 416 may include devices such as a mouse or touch screen. The processors 408 may include a single core, multiple cores, or a cluster of cores in a cloud computing architecture. The server 402 may also be connected through the bus 410 to a network interface card (NIC) 420. The NIC 420 may connect the server 402 to the network 406.

The network 406 may be a local area network (LAN), a wide area network (WAN), or another network configuration. The network 406 may include routers, switches, modems, or any other kind of interface device used for interconnection. The network 406 may connect to several client computers 404. Through the network 406, several client computers 404 may connect to the server 402. The client computers 404 may be similarly structured as the server 402.

The server 402 may have other units operatively coupled to the processor 408 through the bus 410. These units may include tangible, machine-readable storage media, such as storage 422. The storage 422 may include any combinations of hard drives, read-only memory (ROM), random access memory (RAM), RAM drives, flash drives, optical drives, cache memory, and the like. The storage 422 may include a DBMS 424, a storage array, or JBOD as used in an embodiment of the present techniques. Although the DBMS 424 is shown to reside on server 402, a person of ordinary skill in the art would appreciate that the DBMS 424 may reside on the server 402 or any of the client computers 404.

Figure 5:
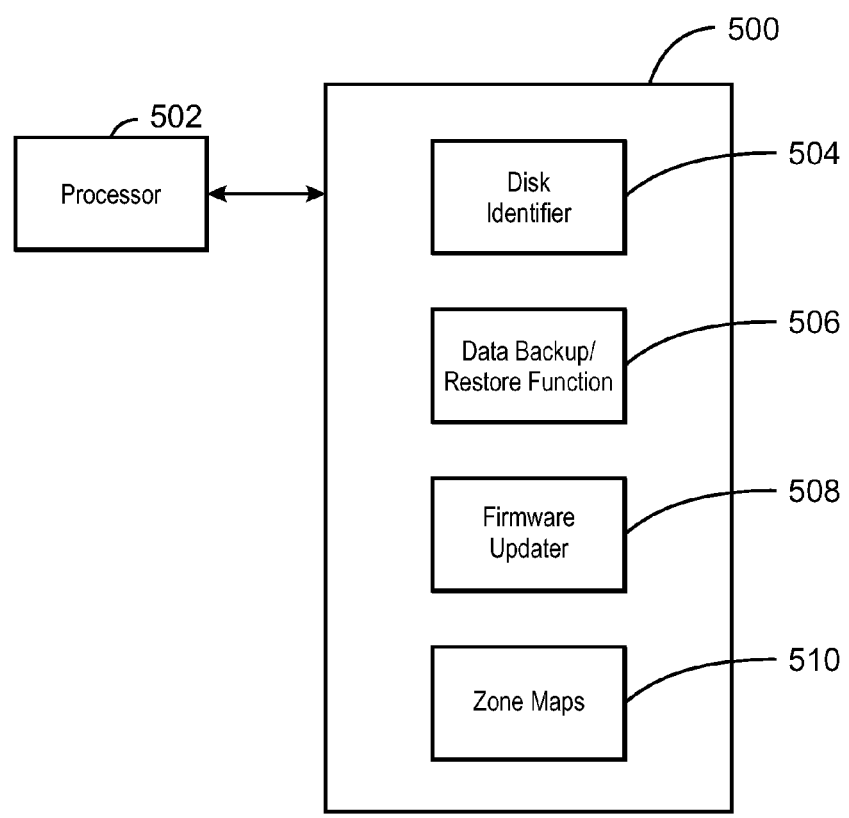
FIG. 5 is a block diagram showing a non-transitory, computer-readable medium that stores code for a zero downtime flash according to an embodiment of the present techniques.

FIG. 5 is a block diagram showing a non-transitory, computer-readable medium that stores code for a zero downtime flash according to an embodiment of the present techniques. The non-transitory, computer-readable medium is generally referred to by the reference number 500.

The non-transitory, computer-readable medium 500 may correspond to any typical storage device that stores computer-implemented instructions, such as programming code or the like. For example, the non-transitory, computer-readable medium 500 may include one or more of a non-volatile memory, a volatile memory, and/or one or more storage devices.

Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disks, compact disc drives, digital versatile disc drives, and flash memory devices.

A processor 502 generally retrieves and executes the computer-implemented instructions stored in the non-transitory, computer-readable medium 500 for zero downtime flash. At block 504, a disk identifier determines which disks need a firmware update. At block 506, the data backup and restore function may copy user data from the disk to be updated. User data from the disk to be updated may be copied to a spare disk, and new data may be written to both the disk to be updated and the spare disk. Further, zone maps may be built as a result of new user data.

At block 508, the firmware updater updates the firmware of the hard disk. The firmware may be updated for each hard disk that calls for a firmware update. At block 510, zone maps may be used to identify what user data has been updated during the firmware update. Zone maps may be maintained for the disk to be updated, and user data may be restored with the data backup/restore function 506 based on the zone map.

What is claimed is:

1. A system for zero downtime flash, comprising:
   a processor that is configured to execute stored instructions; and
   a memory device that stores instructions, the memory device comprising computer-executable code, that when executed by the processor is configured to:
   determine which disks need an update;
   copy user data from a disk to be updated to a spare disk, writing new data to both the disk to be updated and the spare disk;
   maintain a zone map for all volumes of the disk to be updated;
   update a firmware on the disk to be updated;
   copy changed data, based on the zone map, from the spare disk to the newly updated disk, writing new data to both the newly updated disk and the spare disk; and
   write new data to the newly updated disk when the changed data has been copied to the newly updated disk.

2. The system recited in claim 1, comprising discovering the disks using a product identification number.

3. The system recited in claim 1, comprising an array controller staging the firmware update by writing the firmware update to a reserved section of the disk to be updated.

4. The system recited in claim 1, comprising checking a number of preconditions to ensure that zero downtime flash is available.

5. The system recited in claim 1, comprising repeating claim 1 until all disks needing a firmware update have been updated.

6. The system recited in claim 1, comprising an array controller broadcasting to a plurality of registered array controller internal components that the disk to be updated is preparing to go offline, said array controller waiting until all registered array controller internal components have stopped usage of the disk to be updated before taking the disk to be updated offline.

7. The system recited in claim 1, comprising a fast rebuild using an array controller to write new data to the newly updated disk based on the zone map, and bypassing data that was not changed.

8. A method for zero downtime flash, comprising:
   determining which disks need an update;
   copying user data from a disk to be updated to a spare disk, writing new data to both the disk to be updated and the spare disk;
   maintaining a zone map for all volumes of the disk to be updated;
   updating a firmware on the disk to be updated;
   copying changed data, based on the zone map, from the spare disk to the newly updated disk, writing new data to both the newly updated disk and the spare disk; and
   writing new data to the newly updated disk when the changed data has been copied to the newly updated disk.

9. The method recited in claim 8, comprising discovering the disks using a product identification number.

10. The method recited in claim 8, comprising an array controller staging the firmware update by writing the firmware update to a reserved section of the disk to be updated.

11. The method recited in claim 8, comprising checking a number of preconditions to ensure that zero downtime flash is available.

12. The method recited in claim 8, comprising repeating claim 8 until all disks needing a firmware update have been updated.

13. The method recited in claim 8, comprising an array controller broadcasting to a plurality of registered array controller internal components that the disk to be updated is preparing to go offline, said array controller waiting until all registered array controller internal components have stopped usage of the disk to be updated before taking the disk to be updated offline.

14. The method recited in claim 8, comprising a fast rebuild using an array controller to write new data to the newly updated disk based on the zone map, and bypassing data that was not changed.

15. A non-transitory computer-readable medium comprising code configured to direct a processor to:
   determine which disks need an update;
   copy user data from a disk to be updated to a spare disk, writing new data to both the disk to be updated and the spare disk;
   maintain a zone map for all volumes of the disk to be updated;
   update a firmware on the disk to be updated;
   copy changed data, based on the zone map, from the spare disk to the newly updated disk, writing new data to both the newly updated disk and the spare disk; and
   write new data to the newly updated disk when the changed data has been copied to the newly updated disk.

16. The non-transitory computer-readable medium recited in claim 15, comprising discovering the disks using a product identification number or an array controller staging the firmware update.

17. The non-transitory computer-readable medium recited in claim 15, comprising checking a number of preconditions to ensure that zero downtime flash is available.

18. The non-transitory computer-readable medium recited in claim 15, comprising repeating claim 15 until all disks needing a firmware update have been updated.

19. The non-transitory computer-readable medium recited in claim 15, comprising an array controller broadcasting to a plurality of registered array controller internal components that the disk to be updated is preparing to go offline, said array controller waiting until all registered array controller internal components have stopped usage of the disk to be updated before taking the disk to be updated offline.

20. The non-transitory computer-readable medium recited in claim 15, comprising a fast rebuild using an array controller to write new data to the newly updated disk based on the zone map, and bypassing data that was not changed.

* * * * *